US009390431B2

(12) United States Patent
Fletcher et al.

(10) Patent No.: US 9,390,431 B2
(45) Date of Patent: Jul. 12, 2016

(54) SYSTEM AND METHOD FOR REWARDING COMMUTERS

(71) Applicant: FREEWHEELER PTY LTD., Perth (AU)

(72) Inventors: Paul Fletcher, North Fremantle (AU); Alexander Fletcher, Fremantle (AU)

(*) Notice: Subject to any disclaimer, the term of this patent is extended or adjusted under 35 U.S.C. 154(b) by 0 days.

(21) Appl. No.: 14/416,058

(22) PCT Filed: Nov. 26, 2013

(86) PCT No.: PCT/IB2013/060414
§ 371 (c)(1),
(2) Date: Jan. 20, 2015

(87) PCT Pub. No.: WO2014/080380
PCT Pub. Date: May 30, 2014

(65) Prior Publication Data
US 2015/0206166 A1 Jul. 23, 2015

(30) Foreign Application Priority Data

Nov. 26, 2012 (AU) ................................ 2012905141
Mar. 18, 2013 (AU) ................................ 2013900949

(51) Int. Cl.
*G06Q 40/00* (2012.01)
*G06Q 30/02* (2012.01)
(Continued)

(52) U.S. Cl.
CPC ............ *G06Q 30/0226* (2013.01); *G06Q 10/06* (2013.01); *G06Q 30/0207* (2013.01); *H04W 4/028* (2013.01); *B60L 2200/12* (2013.01); *G06Q 50/14* (2013.01)

(58) Field of Classification Search
CPC ....... G06Q 10/00; G06Q 20/00; G06Q 30/00; G06Q 40/00
USPC ........................................................ 705/3–44
See application file for complete search history.

(56) References Cited

U.S. PATENT DOCUMENTS 8,793,066 B2 * 7/2014 Panabaker et al. ............ 701/410
8,855,903 B2 * 10/2014 Chiu ............................ 701/117
(Continued)

FOREIGN PATENT DOCUMENTS

KR  1020120046944   5/2012
KR  1020120114690   10/2012

OTHER PUBLICATIONS www.eltis.org, date of publication as early as Sep. 5, 2012.
(Continued)

*Primary Examiner* — Frantzy Poinvil
(74) *Attorney, Agent, or Firm* — Law Office of Jeff Williams; J. Oliver Williams

(57) ABSTRACT

This invention provides for tracking and rewarding commuters according to their contribution to unclogging roads by opting for alternative transport forms and improving their health and the health of the environment. In particular, the invention relates to commuters who travel under human power to and from their place of work and who sign up as subscribers to a managed system that tracks their travel events, compares data gathered about the event with other events and determines whether or not the event qualifies as a commute, in which case an account of the user is credited. When the accumulated credit in the account reaches a threshold amount, the user qualifies for receiving a reward such as by means of a value token.

8 Claims, 2 Drawing Sheets

(51) Int. Cl.
  *G06Q 10/06* (2012.01)
  *H04W 4/02* (2009.01)
  *G06Q 50/14* (2012.01)

(56) References Cited

U.S. PATENT DOCUMENTS

| | | | | |
|---|---|---|---|---|
| 8,909,476 | B2* | 12/2014 | Tuukkanen | 701/538 |
| 2007/0005233 | A1* | 1/2007 | Pinkus et al. | 701/200 |
| 2008/0021723 | A1 | 1/2008 | Devarakonda | |
| 2009/0112639 | A1* | 4/2009 | Robinson Beaver | 705/5 |
| 2009/0210271 | A1 | 8/2009 | Abrams | |
| 2009/0210302 | A1* | 8/2009 | Tashev et al. | 705/14 |
| 2009/0287408 | A1 | 11/2009 | Gerdes et al. | |
| 2010/0088023 | A1* | 4/2010 | Werner | 701/206 |
| 2011/0029358 | A1 | 2/2011 | Hyde et al. | |
| 2011/0144904 | A1* | 6/2011 | Pinkus et al. | 701/201 |
| 2012/0130727 | A1 | 5/2012 | Ahmed | |
| 2012/0191537 | A1* | 7/2012 | O'Sullivan et al. | 705/14.49 |
| 2013/0006733 | A1* | 1/2013 | Fisher | 705/14.12 |
| 2015/0046081 | A1* | 2/2015 | Brand | 701/430 |
| 2015/0088423 | A1* | 3/2015 | Tuukkanen | 701/538 |

OTHER PUBLICATIONS www.georgiacommuteoptions.com, date of publication as early as May 17, 2014.
www.icommutesd.com, date of publication as early as Feb. 1, 2013.
www.nuride.com, date of publication as early as Dec. 18, 2014.
www.yomp.co, date of publication as late as Dec. 18, 2014 (yomp.com formerly known as "PleaseCycle").
International Search Report and Written Opinion of the ISA (US), mailed May 9, 2014, 9 pages.
International Preliminary Report on Patentability (Chapter II), mailed Dec. 10, 2014, 5 pages.
news.stanford.edu/news/2012/april/traffic-incentive-study-040212.html, as early as Apr. 2, 2012.
www.carbondiem.com, as early as Nov. 1, 2012.
giveo2.com, as early as Aug. 6, 2012.
en.wikipedia.org/wiki/Google_Now, as early as Jul. 5, 2012.
sunset-project.eu/?p=362, as early as Dec. 7, 2013.
www.rideamigoscorp.com, as early as Oct. 26, 2012.
urbanengines.com, as early as Dec. 18, 2013.
Korean First Office Action in Korean counterpart Application No. 10-2015-7017064, issued by Korean Intellectual Property Office, Feb. 24, 2016.
www.autoblog.com/2009/Nov./29/volvo-introduces-co2-tracking-commute-greener-mobile/, date of publication as late as Nov. 29, 2009.
http://www.innovcity.com/2011/May/13/shared-transit-now-has-a-loyalty-program/, date of publication as late as May 13, 2011.

* cited by examiner

SYSTEM AND METHOD FOR REWARDING COMMUTERS

FIELD OF INVENTION

This invention relates to a trip monitoring system and a method of rewarding persons, in particular commuters, for using beneficial forms of travel. The "benefits" refer to means of local travel that involve one or more of: exercise, minimising emissions and pollution, reducing road congestion, reducing use of motor vehicles, enabling higher density living, contributing to city ambience and quality of life and generally easing the load on city infrastructure.

In particular the invention contemplates and proposes a system of reward for those who commute to work (or other regular destinations) using green travel means—and preferably under their own power—as a way of promoting and achieving the above benefits, in particular improved workforce health and productivity and decreased pressure on the environment and economy (from health and infrastructure spending).

BACKGROUND TO THE INVENTION

For the purposes of this specification, the term "commute" is given the Merriam-Webster meaning—"to travel regularly to and from a place and especially between where you live and where you work".

The main beneficial forms of travel are cycling, running, walking and public transport. The main benefits are exercise, reducing road congestion and reducing emissions. Cycling is considered to have the ideal mix of vehicle-based speed and human-powered health and environmental benefits. A significant cost borne by employers, health insurers and state health systems relates to illnesses associated with a sedentary lifestyle. There is arguably a global obesity epidemic. For example, Monash University states that obesity is the most serious health issue facing the developed world. Further, mental and stress-related illnesses are on the rise as increasing populations, decreasing resources and technological advances create more competitive, faster-paced societies. It is proposed that healthy and fit people work harder, take fewer sick days, are less of a drain on the health system, have a greater sense of well-being and contribute more to their families and society.

It is general knowledge that regular exercise is fundamental for good health, however as people get busier and more reliant on technology they often neglect to exercise, even though exercise can usually be incorporated into peoples' everyday routine. While flexible, remote working is being adopted more widely, the majority of workers still commute daily to their place of work. This commute time represents a significant untapped resource—people should be encouraged to spend it exercising, rather than just travelling.

Efforts have been made regularly to encourage the use of bicycles by commuters, especially where distances for walking or running (or even swimming partly) to work are impractical. The City of Brisbane, following the lead of certain European cities, has implemented a system of making bicycles available for hire to anyone in the central business area and nearby environs wishing to undertake a short trip. However, this pay-as-you-go initiative does not provide incentive to use bicycles for the actual commute to and from work.

Although cyclists are not bound to follow any particular route into an area of a city such as its central business district (CBD), more and more cities are developing designated, dedicated, or purpose-built bike-ways to facilitate cycling into their CBD, thereby reducing the number of cyclists on the roads and attendant risks.

Loyalty and reward schemes are well known to air travellers and shoppers. Airline loyalty schemes are based on distances flown and provide various forms of rewards of a material kind to their subscribers. Shopping rewards are based on money spent at the host store and may provide financial rewards such as discounts for further purchases, or more material rewards such as goods or holidays or accommodation when different levels of expenditure are reached by the subscribing shopper. In addition, it is notable that the reward-earning systems are specific to particular stores or enterprises.

Toll roads make use of transmitting devices mounted to vehicles to detect and identify them and their owners as they pass receiver stations at toll gates. However, these are for exacting a toll from the driver for the convenience of using the road, rather than rewarding a motorist. Often this discourages drivers from using the toll road, as in the case of the "Clem 7" Tunnel road system in Brisbane, Australia.

The Australian government has set a carbon emissions reduction target of 5% by 2020. Key to achieving this goal was replacement of coal-fired power stations by gas, but the huge growth in gas exports has helped increase the domestic gas price to the extent that replacing many of the old power facilities is no longer economically viable. Other measures are needed to enable the target to be approached, let alone reached.

The said government has planned a $3 billion "Emissions Reduction Fund" from which to finance "green" projects intended to reduce carbon emissions. There is also a national 15 year infrastructure plan, involving accelerated delivery of major roads and highways that it is hoped will reduce bottlenecks on currently gridlocked roads and highways. However, conventional wisdom suggests that bigger roads just attract more vehicles, so that the congestion cycle repeats, each time on a larger scale than before. At least a part of the solution would appear to lie in getting current road users to not use the roads or to only use them for public transport.

Australian cities are beginning to experience levels of congestion that were eclipsed long ago in other countries. It is clear that cities the world over need to implement measures that improve the health and quality of life of their inhabitants, limit further congestion and urban sprawl and, perhaps most importantly, preserve natural resources and avoid further environmental damage. The global financial crisis and ongoing issues in the United States of America and Europe reveal that (at least some) economic systems are unstable and overstretched. Given the huge numbers of people commuting daily, combined with the economic cost of healthcare, road infrastructure, pollution and climate change, there is a strong economic (not to mention social and environmental) case for privately and publicly (government) funded beneficial commute measures.

The smartphone application "re:route" provides London commuters and other travellers with a trip-planning platform whereby the user inputs his starting point and destination addresses and the app suggests different routes and modes of travel for the user to choose in making the trip. The re:route app was designed to encourage cycling and walking. It uses a GPS-reliant system to record when the trip is completed and, provided the trip qualifies (it must be at least 4 minutes in length), awards 5 points per trip, which points then accumulate to the user and can be redeemed as discounts with participating retailers. According to an article describing re:route: "To use the app, travellers input their route's start and end points to discover ways that mix and match public transportation with walking and cycling; they can also customize routes based on goals—if they want to focus on maximizing calorie burn or minimizing carbon footprint."

Shortcomings of the above known system are that the rewards offered are fairly trivial retail discounts or similar, in awarding points the app does not differentiate by kilometers/miles travelled, the app does not award points for using public transport, the app does not award different types of points depending on mode of travel (which allows rewards to be more targeted), the app does not record non-beneficial trips (for the purposes of comparison and building a data set) and the app does not specifically cater for employers and other organisations/associations/institutions to create an account in order to encourage their members to commute beneficially (or reward the organisation for doing so, for example by advertising their involvement to the public or by rewards/incentives issued by governments or other companies). A further shortcoming is that it seems to reward any qualifying trip, rather than focussing on regular commutes. This means that users are encouraged to use the app for purely recreational/health/fitness purposes, whereas the present invention aims to encourage beneficial forms of commute in circumstances where a harmful form of commute is the default option, or at least a tempting alternative. Where the user is simply going for a run/walk/cycle for exercise or leisure, the use of a harmful form of commute is not a realistic alternative.

The smartphone application "Calico" similarly encourages users in Perth, Western Australia to get fit and active by engaging GPS technology to monitor users' exercise regimes (by way of walking, running and cycling) and awarding points which can be redeemed with participating local businesses. The app monitors distance, speed and calorie consumption, among other things. The makers describe Calico as a "fitness app".

A shortcoming of the above known system, in terms of encouraging beneficial commuting, is that Calico is confined to health and fitness. It does not specifically encourage commuters (or organisations) to swap harmful forms of commute for beneficial forms of commute and it does not provide a tailored system for doing so. It consequently does not address the congestion, infrastructure and environmental problems that the present invention covers. Like re:route, the rewards are retail discounts and offers by participating retailers. The app does not appear to contemplate the employer of the individual, the government or other organisations/associations/institutions using the app to enable more significant and sophisticated rewards (for example tax incentives) to encourage beneficial forms of commuting.

A known tracking system used by sports-people for calculating their distances and times is the GPS-reliant system known under the trade-name "Strava". This system requires users to log in to it as subscribers and download the Strava software application or "app" to their GPS device. The GPS device could be a GPS-enabled mobile telephone or a dedicated GPS device such as a hand-held or wearable satellite-navigation or global locating aid, an example being the Garmin Edge 500™ GPS-based cycling computer, "for performance-driven cyclists". The app enables the user to use his or her GPS-enabled device to track his or her rides or runs. Once the user has completed a ride or run, the user's monitored activity data is uploaded automatically to the website Strava.com, operated by the proprietor of the system. Alternatively, the user's data may be synchronised with the user's Strava account using a personal computer logged into the Strava website.

A shortcoming of the above known system is that although it provides users with motivational features such as the facility to set progress goals, it does not provide for the issuing of rewards, such as in the form of value, when targeted achievements are reached, in particular in the context of commuting, managing commuter traffic and encouraging participation in health-promoting behaviours. Instead, it encourages competition between users and for users to compare their performances with those of other subscribers. The emphasis here is on training and performance, rather than encouraging the use of cycling, running or walking as a commuting tool.

OBJECTS OF THE INVENTION

It is an object of this invention to address the shortcomings of the prior art and, in doing so, to provide a system that will encourage commuters to make use of more beneficial forms of travel in their daily commutes (for example for people who drive fossil-fuelled cars to cycle/walk/run or catch public transport or drive electric/solar-powered cars, or for people who catch public transport to cycle/walk/run).

The use of human power, in propelling conveyances such as bicycles (or simply walking or running), by commuters is a highly desirable outcome, especially if these conveyances/persons can utilise existing under-used infrastructure or be provided with dedicated roadways/pathways to encourage such travel.

The use of public transport, rather than road-based fossil-fuelled vehicles, is also a desirable outcome.

A further object of the invention is to provide a system of reward that helps address the infrastructure issues faced by many cities, including reducing congestion on the roads (and decreasing the associated stress and wasted time experienced by commuters), alleviating parking issues, encouraging higher-density living, utilising under-used existing infrastructure and encouraging new infrastructure that is more economically, socially and environmentally beneficial than the standard road and traffic based approach.

A further object of the invention is to provide a method of helping to reduce air pollution and associated environmental damage by encouraging alternatives to the use of fossil-fuelled vehicles.

A further object is to provide a system of reward that contributes to improving the health of the general population by encouraging an increasing number of individuals to participate in regular cardiovascular exercise.

The preceding discussion of the background to the invention is intended to facilitate an understanding of the present invention. However, it should be appreciated that the discussion is not an acknowledgement or admission that any of the material referred to was part of the common general knowledge in Australia or elsewhere as at the priority date of the present application.

Further, and unless the context clearly requires otherwise, throughout the description and the claims, the words 'comprise', 'comprising' and the like are to be construed in an inclusive sense—that is to say, in the sense of "including, but not being limited to"—as opposed to an exclusive or exhaustive sense—that is to say meaning "including this and nothing else".

SUMMARY OF INVENTION

According to this invention, there is provided a system for recognising and rewarding desirable commuting behaviour by subscribers to the system, said system comprising
  data storage means comprising an electronic register of subscribers to the system and an account for each,
  tracking means for tracking subscriber commutes, and computer means programmed to
    determine whether the travel event meets predefined commute-qualifying criteria for categorising it as a commute,
    determine a credit value for each commute according to predetermined criteria and update the account of the associated subscriber accordingly,
    compare an accumulation of a subscriber's credits with a reward-issuing threshold; and
    notify the subscriber of having qualified for a reward when the threshold is exceeded.

Preferably, the system is programmed with subscriber-adjustable settings allowing the subscriber to control the criteria for the issuing of notifications.

It is within the scope of this invention that the subscriber is an employer or other organisation who might earn rewards from the government, or from a major corporation which approves of the employer's involvement in the system, such as on the basis of corporate social responsibility, or a quality endorsement.

Different types of credits are awarded depending on types (and even times) of travel (Eg cycling points, running points, bus points, peak hour points). It is intended that the more "beneficial" the travel event (measured against the "benefit" types listed above), the higher the value of the reward credits—for example, running 2 km to work will generate more reward credits than a 2 km bus trip, or cycling 30 km to work will generate more credits than cycling 5 km to work, and cycling on a designated cycle path will generate more credits than cycling on a main road.

In a preferred form of the invention, the credit value is a function of a beneficial effect of a commute, computed according to pre-defined benefit criteria. For example, the predefined benefit criteria define desirable behaviour to include a subscriber commute in which a prescribed minimum segment is achieved by using a particular form of transport or conveyance.

Credit value awarded may further depend on type of travel, distance of travel and other criteria. For example, a criterion may be that the segment is required to be accomplished without using any conveyance that is an animal, or is animal-drawn, or has more than three wheels and is combustion-engine driven. Travel by bus is not necessarily excluded, the extent of road use being merely one factor for taking into account when determining credit value. By way of example, the driving of a solar-powered car on a public road would be awarded a greater number of credits than driving the same size of electric vehicle on that road. Also, a person who lives 2 kilometers from the city, drives one kilometer to the train station and then catches a train to work, using up a parking bay for the day would qualify for credits for public transport, but would receive zero credits, or even be penalised, for (a) driving to the train station, (b) using the car park and (c) not walking or cycling directly to work. The software can then apply more and more criteria regarding what is "beneficial" as system needs evolve.

In addition in an embodiment, the system is programmed with criteria providing for the "credits" to be weighted, so that short distance travel events score higher per kilometer than long commutes, in order that people are encouraged to live near the CBD, rather than getting huge points for commuting from far away.

Preferably, the computer is programmed further for one or more of the following:
    receiving data relating to subscriber location
    logging travel events attributable to a subscriber.
    determining whether a logged travel event includes characteristics of desired commuter behaviour according to predetermined criteria to qualify as a beneficial commute and be credit-earning.
    posting credit commensurate with the extent of said behaviour to the account of the subscriber.

Further, in the invention, the data storage means contains individual subscriber data and a travel event is determined to be a commute on the basis of comparing data of the tracked travel event with said individual subscriber data. The subscriber data comprises the subscriber address. Furthermore, the subscriber data may comprise the subscriber's work or other relevant address (for example, university) and working/contact hours. These may be set or determined on the basis of historical data captured in the data storage means.

In an embodiment, the previously tracked travel data includes commute beginning and end point locations associated with the subscriber.

The system preferably further comprises means for issuing a reward in electronic form to the subscriber. The reward may be a voucher, or a printable or purely electronic value token redeemable at a designated reward giving agent of the system. In an embodiment, the computer is programmed by way of its software to simply notify a reward-giver that a subscriber has achieved qualification for a reward, such that the reward is automatically activated, for example a tax incentive or insurance premium discount, with confirmation being communicated to the subscriber, and in the case of a subscriber being an organisation of multiple subscribing members, the individual commuter member too.

In a further preferred form of the invention, the credit value is a positive number if a subscriber travel event, which has been determined to qualify as a commute, includes a segment or segments of the commute in excess of a prescribed minimum that is accomplished using a beneficial form of travel.

In an embodiment, the system comprises means for communicating to the subscriber notification of having qualified for a reward and providing the subscriber a choice of rewards.

The subscriber may be an individual or a group of individuals, for example an employer company or a club having members. A group (such as a club) would have a common goal of accumulating qualifying journeys to attain a target resulting in a reward being issued to the group as a whole. In the case of an employer company, the individual employees could have their own accounts for personal rewards (from the employer or otherwise), however the employer company could also create an account which would record the number of its employees participating in the scheme, record their collective performance and potentially qualify the employer for rewards in its own right (for example from the government, local councils or other companies) and the company may or may not pass on such rewards to its participating employees.

In an embodiment, the tracking means comprises transponder means, and two or more detection stations located on a designated commuter route, making use of RFID technology of generally known components and configuration.

In a preferred embodiment, the tracking means comprises a plurality of mobile global positioning-enabled devices (GPS devices) allocated to respective subscribers, and
    computer means configured and programmed to
        maintain a data-receiving account associated with the subscriber using the GPS device,
        receive location and time-related data captured by means of said device,
        update the account with the location and time-related data, compare changes in location of the device with pre-set criteria, compute whether or not the location and time-related data and two or more changes in location represent a travel event, characterise the travel event according to the criteria, calculate whether an accumulation of data representing travel events made by the subscriber qualifies the subscriber for a reward or rewards, according to the criteria, and notify the subscriber accordingly.

The computer preferably is further programmed to compare location and time-related data against maps.

In a further preferred form of the invention, the GPS devices are configured to communicate, over a global communications network, such as the internet, with said computer means. Preferably, the communications are at least in part encrypted.

In an alternative preferred form of the invention, the computer means comprises first computer means remotely located from the GPS device and second computer means housed with the GPS device to be carried with it. Preferably the second computer means is integrated with the GPS device. In a preferred embodiment, the second computer means and the GPS device are integrated into a mobile telephone, tablet or similar device. Alternatively, they are integrated into a device for wearing or attachment on the person of the subscriber.

In a further preferred form of the invention, the first and second computer means between them perform the functionality of the first mentioned computer means above.

Preferably, data captured by the GPS device is retained on both the first and second computer means, such as for back-up and security/redundancy purposes.

In a preferred form of the invention, the criteria relate to travel involving a threshold level of human effort.

Preferably, the criteria further relate to travel carried out without the use of power derived from a fossil fuel.

The system computer is further loaded with a software app capable of recognizing different "legs" or segments of a travel event. Thus one commute might involve a combination of driving, walking and public transport, so that the relative advantages and disadvantages of each leg are compared and computed when awarding credits for the event.

Generally, in this invention, in a preferred embodiment, a subscriber is a cyclist, who engages in the physical activity of commuting to his place of work by bicycle (push-bike), and carries a mobile telephone (or a similar wearable communications device) that comprises the GPS device, the second computer means, and installed software application means, adapted for causing the second computer means to be programmed to transmit, to a centralised database managed by the first computer means, data about a travel event undertaken by the subscriber, on the basis of location and time data captured in use by the GPS device.

In other embodiments, the subscriber engages in forms of exercise other than cycling to work. In such embodiments, reward systems based on different criteria are provided and reward-qualifying notification means is activated when stipulated criteria are met. For example, for the same distance, catching the train to work would generate fewer points than cycling (more congestion and emissions, less exercise I.e. just walking to/from the station) and running would generate more points than cycling (more exercise).

Rewards may comprise pecuniary elements or material goods, or a combination thereof. They may also comprise work-related benefits for a subscriber, or credits to a charity.

Further, according to the invention, rewards may be provided by sponsors generally seeking advertising exposure or seeking to target particular types of desirable customer, with the first computer means being programmed to receive from the host computer sponsor-related information for display on the display or by way of audio output. For example, such information may be output when the device is switched on, or the program interfacing with the system is caused to run.

Yet further, according to the invention, there are provided locating means associated with each subscriber and being capable of capturing data pertaining to the location of such means as a representation of the subscriber's location, and computer means having loaded thereon programming instructions comprising input means enabling a commuter to subscribe to the system, comprising means for receiving subscriber location data from said locating means, and being programmed for processing said data, calculating the rate of travel categorising the travel event, logging travel event by the subscriber to and from said subscriber's workplace (or other qualifying commute destination) by a beneficial form of travel, and determining whether a subscriber's travel events satisfy a reward-qualifying criterion; and outputting notification when said criterion is satisfied.

In a preferred form of the invention, the computer means is remotely located with respect to the locating means. In an embodiment, the computer means is comprised in a server operable by a manager of the subscriber database. The computer means is programmed to process the location data to detect whether the subscriber location has changed.

Preferably, the computer means is programmed further to calculate the extent of a location change and further preferably to determine the nature of conveyance assumed to have resulted in the change, for example whether the rate of change is representative of a travel event undertaken by bicycle or by foot, and whether by running, or walking. The number of points awarded per kilometer can be tailored to the mode of beneficial travel.

In a preferred embodiment of the invention, the computer means is associated with, so as to be borne by, the subscriber. The computer means may be adapted for wearing by the subscriber, or for carrying in a receptacle on the subscriber's person, or on his or her conveyance means, or for attachment thereto.

In a preferred form of the invention, the reward-qualifying criterion takes into account travel event distance.

In a further preferred form of the invention, the criterion takes into account travel event time. Alternatively, or in addition, data to be taken into account includes speed, land date, for determining the travel event is in peak hour on a work day or is to a big event, in which case the authorities might want to reward certain forms of commute between certain periods.

In a still further preferred form of the invention, the location determining means comprises real time location means.

Thus, according to an embodiment of the invention, a subscriber cyclist carries a mobile telephone comprising computer means and global positioning means and a software application installed which causes the computer means to be programmed to transmit, to a centralised database, data about a travel event undertaken by the subscriber.

Data relating to the travel event undertaken is stored in the database. A computer monitors the database and calculates whether a subscriber has qualified for a reward, based on the travel events undertaken.

The tracking can be switched on or off manually by the subscriber, or, preferably, be activated automatically via activation means such as proximity sensing means on the subscriber's bicycle. Most preferably, the system is configured to track the subscriber automatically. In particular, by saving their work commute as a regular commute, the GPS function will be programmed to switch on at specific times per day and to record the commute when the subscriber passes a pre-programmed start point. An example of such means is a proximity switch. Another example is a transponder having communication with the device.

Alternatively, the program is designed to distinguish a bicycle travel event from a motor vehicle trip or walk or running travel event. This is done by calculating not only instantaneous velocity but also acceleration/deceleration and average speeds. Preferably, the data is compared with history data. Historical subscriber data can include personal data of the subscriber's recent or earlier travel events, or data acquired from other subscribers, particularly those subscribers located nearby.

Instead of satellite-based GPS, the system could make use of stationary monitoring stations and be programmed to apply triangulation calculations in determining location, as is known in the art.

Preferably, in this embodiment, the computer means in the subscriber's possession comprises a signal-emitting device. The device may comprise a radio-frequency (RF) transmitter. Preferably, the signal-emitting device is integrated with the transmitter, so as to be part of a mobile telephone unit. It may be programmed to function in transponder mode.

In a preferred embodiment, the receiver means comprises means for broadcasting a stimulus that is receivable by the subscriber's mobile telephone or similar device, stimulating the telephone to emit a signal in response. Further preferably, the system includes attachment means for the telephone to be securable to the person or bicycle of the subscriber.

Further, according to an embodiment of the invention, the stationary monitoring station is in close proximity, preferably built into, or located adjacent to, a designated commuting route recommended for use by subscribers to the system. In this embodiment, the mobile telephone device is adapted to emit its signal according to a short range wireless transmission standard, such as the Bluetooth® standard.

In a further preferred form of the invention, the system includes an individual account created for and allocated to each subscriber, to which a record of his travel events is posted by operation of the computer means according to its programming. Preferably, the app is programmed to record the subscriber's non-beneficial and beneficial forms of travel, for example for use in statistical analyses and building a profile of that subscriber. In addition to commuter profiles, participating employers and other organisations would have profiles too, showing for example the numbers of their employees commuting beneficially, number of kilometers travelled and modes of transport, listing other employer initiatives for encouraging their employees to commute beneficially and safely—all in order to encourage employers to get involved. In issues of social responsibility.

In a further preferred form of the invention, the detection means comprises communication means for establishing communication with the computer means, enabling the uploading of data relating to travel events logged.

Still further, according to the invention, the computer is programmed for additionally:
identifying the subscriber associated with the signal received,
posting an entry to the account of said subscriber relating to said signal,
compiling a record of the subscriber's travel events,
assessing the record, and
communicating notification of a reward when the record indicates the subscriber satisfies a reward-qualifying criterion.

Optionally, the system is programmed for using the record in building a profile of the subscriber concerned, or of a group of subscribers, or for analysing commuter trends for town and related civic planning.

In a preferred form of the invention, the computer is programmed according to the criterion, for taking into account the number of signals associated with a particular subscriber that are detected by the detection means within a pre-set period of time. Preferably, the computer is programmed to accept only a limited number of the signals detected during said period for reward-qualifying purposes. In an example, the time period is 24 hours and the signals limit is set at four—for records of the to-work commute and the return commute: the first one of each pair signifying the commencement point of the journey and the other the termination point. If the limit is set at a greater number, the computer is programmed to test additional signals for consistency with the first and last.

In a further preferred embodiment, the database includes residential address details for each subscriber. Preferably it also contains the subscriber's workplace (or other commute destination) address.

Further preferably, the computer is programmed to calculate the distance between the subscriber's residence and the travel event detection means.

In a preferred embodiment, the computer calculates the distance between the subscriber's residence and place of work. The subscriber may register more than one place of residence or work via the system user interface.

In an embodiment, the system includes time recording means for recording the time at which the signal was first detected during the current time period.

The rewards available for claiming depend on the criterion that has been met. In an embodiment, the computer is programmed to notify the subscriber when he has earned the right to a reward and specify a range of rewards that are available. Preferably the computer is programmed to prompt the subscriber to choose a reward online.

In an embodiment, the rewards are progressive, with the computer being programmed to offer rewards of increasing pecuniary value to the subscriber, as his tally of qualifying travel events or accumulated distance of travel rises, rather than being set to zero each time a reward is claimed. The embodiment optionally includes means for adapting the rewards on offer according to the profile of the prospective recipient subscriber.

According to a second aspect of the invention, there is provided a method of recognising and rewarding desirable commuting behaviour by subscribers to a reward system, said method comprising steps of
providing data storage means comprising an electronic register of subscribers to the system and an account for each,
providing tracking means operable for tracking a subscriber travel event,
providing and operating computer means programmed to determine whether the travel event is a commute,
    determine a credit value for each commute according to predetermined criteria and update the account of the associated subscriber accordingly,
    compare an accumulation of a subscriber's credits with a reward-issuing threshold; and
    notify the subscriber of having qualified for a reward when the reward-issuing threshold is exceeded.

According to a further aspect of the invention there is provided a method of operating a system of reward for commuters who make use of non-combustion engine-driven conveyances, having no more than three wheels, to commute to their places of work, the method including the steps of
    providing online means for a commuter to register as a subscriber to the system,
    causing operation of a host computer to enable a communications device, associated with the subscriber, to receive software relating to participation in the system, and registering said device with the system, said software in use enabling the device to be used in detecting travel events associated with the subscriber,
    causing data relating to detected travel events to be stored by second computer means associated with the device, when active,
    causing said data to be communicated to said host computer,
    causing either or both of said second computer and said host computer to compile a record of travel events made by the subscriber,
    inputting to said host computer a criterion against which a reward will be awarded to a subscriber whose record of travel events meets the criterion,
    operating either or both of said second computer and said host computer to
        run an algorithm for determining from the travel event data the means by which the subscriber made each of the travel events,
        determine from the travel event data whether it was a commute, and to label it accordingly,
        test the record against the criterion and output a notification if the record meets the criterion.

Desirably, the data relating to the travel events includes data of the subscriber's location at different times. The subscriber is provided with means to set particular periods during which tracking is permitted and others when not permitted.

Further, the method preferably includes enabling the subscriber's communications device to use real-time locating means to record at intervals its location. The real-time locating means may comprise global positioning means (GPS).

In a still further preferred form of the invention, the software comprises instructions for capturing real-time locating data generated by the real-time locating means.

Preferably, the software includes instructions for the subscriber's communications device, for example a mobile telephone, to transfer the data to the host computer.

Further preferably, the method includes causing the host computer to emit a signal to the real-time locating means to interrogate it as to its location.

According to the invention, the method includes the further step of securing the real-time locating means to the person of the subscriber or to a conveyance, such as a bicycle, to be used by the subscriber.

In an embodiment, the computer is contained in a mobile telephone or similar device associated with an individual subscriber, which mobile telephone is GPS enabled.

Preferably, the computer is configured to be in communication with a remotely-located second, host computer that is programmed to operate and manage the system.

Further preferably, the first, mobile telephone and host computers are configured to communicate via a global computer network, such as the internet.

Further, according to the invention, there is provided a second module of instructions comprising instructions for the first, mobile telephone computer to store the locating data and send a copy of the data to the host computer.

Still further, the software preferably comprises a third module of instructions which, when run by the first mobile telephone computer, causes it to calculate characteristics of a travel event undertaken by the subscriber. The third module preferably comprises further instructions to cause the first mobile telephone to categorise the travel event according to pre-loaded criteria.

In an embodiment, the travel event is categorised either as a commute or as a training exercise and optionally additionally as being human powered or fossil fuel powered.

The commute is then flagged as a travel event qualifying for credit towards a reward.

BRIEF DESCRIPTION OF DRAWINGS

In order that the invention may be readily understood, and put into practical effect, reference will now be made to the accompanying figure. Thus.

DETAILED DESCRIPTION OF EMBODIMENTS OF THE INVENTION

Figure 1:
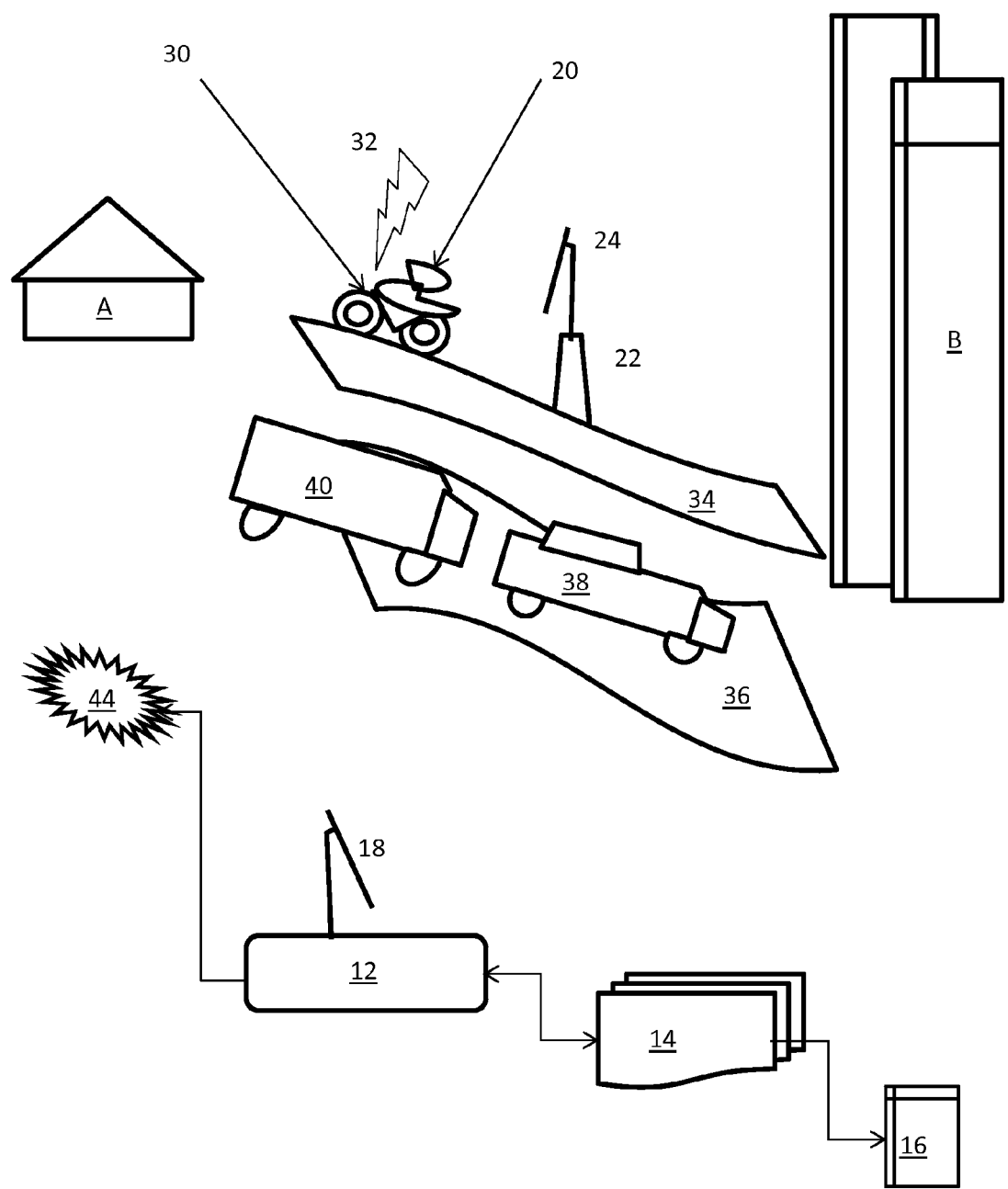
FIG. 1 shows a schematic diagram of the system of the invention according to a first, preferred embodiment.

The invention provides for a commuter, travelling between his residence and a qualifying commute destination such as his place of work or study, to be rewarded for using a beneficial—for example environmentally clean and/or relatively healthy—mode of travel when subscribed to the system. Further rewards accrue for freeing up roadways for self-propelled multi-occupant vehicles, by making use of dedicated travel ways for the commuter's alternative form of travel. Suitable such forms include human-powered apparatus, for example bicycles, and electric powered transportation means such as Segway™ personal transporters, and electric power-assisted bicycles. In particular the system seeks to reward commuters who would otherwise be travelling to work by means of fossil-fuelled road transport means in general. Whether a mode of transport is deemed to be "beneficial" is determined by the administrator or operator of the system, preferably applying pre-agreed or legislated criteria.

The subscriber to the system may be an individual commuter, or may comprise a group of commuters. A group subscriber comprises a plurality of commuters, for example members of a club or employees of an organisation. The members of the group may be working towards a common goal, such as an emissions saving target, or a fitness target. The members each would have an individual account and the employer would have a separate account for its own benefit.

Associated with each commuter is a signal-emitting device that emits an electromagnetic signal. The signal contains means for uniquely identifying the device, its associated user, presumed to be the individual commuter, or both. The identifying means is a code or an electronic file of computer-readable identification data, mapping to the subscriber associated with such code or data.

The signal is receivable at a signal detection station at which a signal receiver is installed, when the emitting device is in receiving range. The detection station is stationary.

In an exemplary first embodiment, the receiving station is located on a designated bicycle commuting route. The station comprises a protective housing for the receiver. Optionally, it is further equipped with a power supply for the receiver. A sustainable power supply such as a solar panel and storage battery may be advantageously utilised. The range of the device transmitter, for example an E-tag, is preferably limited by configuring the transmitter, for example, to a distance of from 2 m to 5 m, more preferably about 3 m, so as to ensure that subscribers cause their bikes to follow designated cycle paths so as to pass within the immediate vicinity of a detection station.

The identity of the subscriber, whose device emitted or is emitting the received signal, is determined by matching the identifying means in the signal with the name of the subscribing commuter associated with this identifier in a computer-managed database. The computer then causes an account associated with the commuter subscriber to be updated to record the fact of the detection of his signal at the detection station. In this way, a record of the journeys undertaken by a subscriber is created. The computer is programmed to compare the particulars received in the data arising from each journey against predefined criteria, and make a determination as to whether the journey qualifies as a beneficial commute and allocate a value to the journey, which value is then credited to the account of the relevant subscriber. Where the subscriber is a member of a group subscriber (such as the individual's employer), the account of the employer will also be updated, as will those of other members of the group on a need-to-know basis. This envisages that private details of travel events by group members will not be shared, but that totals for the group will be (for example). Further, non-beneficial commutes should be recorded too where possible (for the profile element).

When the record or the account meets certain pre-established criteria, a determination is made as to whether or not the subscriber qualifies for a reward, or a range of rewards. If she does, the computer means allocates a reward to the subscriber associated with the record or account and issues notification (or simply records eligibility) accordingly, or notifies the subscriber that she qualifies for one or more from a set of rewards, at her election. The notification is preferably sent over the internet to an email address of the subscriber, a social media page or via a text message, or by means of its programming, the app on the subscriber's mobile phone issuing a reward eligibility alert, for example with a buzz and a message, subject to app notification settings preferred by the commuter user. Preferably the notification includes a hyperlink to a website defining an interface at which the subscriber may browse, claim, order or reserve a reward from the selection available to her.

The signal-emitting device may be a dedicated signal-emitting device such as a transponder or RFID which is attached to the bicycle of the commuting subscriber, for example to the frame or beneath the seat or saddle, or which is carried on the person of the subscriber. Alternatively, it may be a mobile communications device such as a mobile telephone or tablet or similar, in particular a smart phone.

In a non-limiting example, the system makes use of a real time location system (RTLS) for logging the proximity of the subscriber's signal-emitting device to the detection station. The RTLS includes a receiver for receiving a signal emitted by a transmitter device associated with a subscriber.

By way of example, the RTLS uses Bluetooth® communication between phone and detection station for transmitting a data file identifying the subscriber associated with the signal-emitting device, to the detection station, for onward transmission to a server computer for processing and updating of the subscriber account concerned. The result is the compilation of a record of journeys undertaken by or associated with the transmitting device of each subscriber to the system.

The reward system will be based on credit values increasing with perceived benefit, according to criteria set by the system operator or owner. In an embodiment, it provides for each subscriber receiving a basic award credit, according to the form of travel selected on a particular day. Additional rewards will be allocated according to distance cycled. Certain days may be included or excluded in different jurisdictions according to cultural or religious observances.

In circumstances where weather forecasters predict severe weather conditions, credit may be increased for certain modes of travel and decreased for others. For example, when extreme smog is predicted, subscribers can be encouraged to remain in relatively safe atmospheric conditions by using mass transit instead of out-door forms such as bicycles. The credit value for cycling would be reduced for that day or period and increased for train travel.

By way of example only, a reward system according to the invention is based on a maximum of 240 round trips per individual subscriber per year. Suppose credit of $1.50 is posted to the subscriber's account per journey, irrespective of distance. Additional distance deemed travelled is rewarded as follows:

More than 3 km, but no more than 5 km, additional credit of $0.50

More than 5 km, but no more than 10 km, further additional credit of $0.50

More than 10 km, but no more than 20 km, further additional credit of $0.50

More than 20 km, but no more than 40 km, further additional credit of $0.50

More than 40 km, further additional credit of $0.50.

Therefore, the maximum credit available to a subscriber per commuting day is $4.00, if they travel over 40 km that day.

Referring to FIG. 1, in a preferred embodiment of this invention, the system, denoted generally by the numeral 10, comprises a computer 12 which accesses a database 14, containing records of each subscriber to the system. Subscribers are commuters who travel between their place of residence A and place of work B by bicycle, and who elect to subscribe. A subscription fee may be charged by the administrator of the system.

The subscriber data includes information fields, in particular the identity of each subscriber and his or her residential address. Optionally, it may also contain data relating to the subscriber's work address, other contact details, date of birth and banking account details.

Allocated to each subscriber record in the database is an account 16.

When a subscriber 20 subscribes to the system, he also receives a signal-emitting device in the form of a radio frequency identification tag (RFID) 30, which is set up to emit a radio signal 32 containing an identification code mapped to that subscriber. The signal is emitted in response to a stimulus broadcast from the receiver when the tag comes into range of the broadcast.

On approaching within transmission receiving range of a detection station 22, strategically positioned on a designated cycle path leading to the CBD, and equipped with a suitable antenna 24 and signal receiver, in this case an E-tag reader (of construction well known in the art), the RFID signal is received via the antenna and the code is communicated by a further wireless transmission from the receiving station, to antenna 18, which is in communication with computer 12. Such further transmission could also be transmitted wirelessly using a mobile telephone network and/or a global computer network such as the internet.

Of course, as will be appreciated by those skilled in the art, the code need not be communicated wirelessly at all, but between receiving station 22 and computer 12 by using alternative means, such as a telephone landline comprising data-transmitting cable, for example fibre optic cable.

If the subscriber's emitting device is not detected at station 22, clearly there will be no corresponding signal transmitted to computer 12.

The detection station receiver has a broadcasting range that is limited to a distance that will eliminate the stimulation of RFID tag signals from beyond a designated bike path, shown as 34 in FIG. 1. Therefore, if a subscriber chooses to travel by way of a vehicle roadway 36, or transports his bicycle on or in a vehicle 38, or worse still, carries his RFID tag on his person while driving in a car or travelling on a bus 40, it will not be stimulated to emit its signal and therefore will not be registered at the detection station, resulting in the subscriber's motor vehicle journey not being recognised for credit and reward purposes.

The computer 12 regularly interrogates database 14 and accounts 16, testing the account status against a predetermined reward criterion or criteria for those accounts that meet the applicable criterion or criteria for a reward. When a subscriber's account 16 is found to qualify, a notification 44 is issued to advertise this fact. It is issued to the administrator of the system, and optionally also directly to the subscriber concerned, or following approval by the administrator.

In a preferred embodiment of this invention, the reward credit value is based on the distance a subscribing commuter travels to work. This distance is calculated from the address given by the subscriber to the detection station. The computer is pre-programmed to cross-check with home and work addresses submitted originally and with the address of the final signal detecting station.

In an alternative embodiment of the invention, the distance is calculated from the subscriber's residential address to the city's general post office, as this is almost without exception located centrally in the CBD.

To reduce instances in which a subscriber provides as his residential address one that is further from the CBD than his actual address, in order to earn greater or more frequent rewards, it is envisaged that the data provided by subscribers will be matched with data held by employers or universities or government bodies (for example, electoral roll) or similar (subject to privacy considerations). Such checking will preferably be accomplished by means of automated cross-checking from time to time or ad hoc and can be extended to verifying identity and other details.

Alternatively, subscribers will be required to produce satisfactory evidence of their residential address, such as utilities accounts in their name when signing up to the system.

Further, destination addresses will need to be cross-checked/verified on a regular or ad hoc basis to ensure that the trip qualifies as a commute. This will be straight-forward where the trip is a commute to work and the employer has created an account or where the commute is a trip to university and the university has created an account. Where the employer or university or similar is not participating in the scheme, verification could be achieved in a number of other ways, including simply checking the details regarding the type of commute and commute destination entered by the commuter with publicly known map or address details.

Optionally, the system includes means for stimulating or detecting signals from beyond the designated cycle path zone and then penalising the relevant subscriber's account by deducting credit for a previously recorded valid journey. This is intended to increase the incentive for not seeking to defraud the system.

The computer is optionally but desirably linked to a website, such as the website of the city public transport authority, or transport operator. The website desirably has pages dedicated to allowing subscribers online access in order to enable them to:
  register with or subscribe to the system,
  order a transmitting device, for example an E-tag or other RFID used in the system,
  monitor their journey account and journey-related credits,
  claim rewards online (or otherwise electronically), and
  download or print a voucher recording their credit amount, which, when presented by the subscriber or his delegate at a participating reward-issuing organisation, is convertible to a financial or other reward.

In a further embodiment, it is envisaged that subscribers need not necessarily be individuals, but may also be groups of individuals or organisations such as corporate entities represented by one or more commuting individuals. Such groups may sign up as a single subscriber, or as a group of individuals to a single account, or a group of individuals to individual accounts that are processed according to a pre-established arrangement. For example, the individuals in a group are rewarded for their individual efforts at commuting by bicycle, and their organisation is rewarded for the number of commutes its individual commuters undertake as part of a registered or subscribed group.

The invention extends to the system having more than one signal-detecting receiver on a designated bicycle route. Additional data collected from such further receivers can be used for verifying journey data and catering for commuters whose workplaces or residences are in different areas of a city. It is also envisaged that a plurality of designated cycling routes will be established, each having one and preferably a plurality of receivers.

Thus the system can be developed in modules and expanded into a network of detection stations with receivers located to cover a network of bike-ways. In this way, rewards may be given to subscribers travelling by bicycle to special events, rather than only to work during the working week.

The setting of specific time periods over which journey data is collected and counted is adaptable to take into account public holidays, or special event periods and off-peak periods. By setting the period and reward criteria applicable to a particular period, inducements can be offered for people to cycle during promotional periods, such as out of peak hours.

In another embodiment, the invention provides a system comprising a plurality of mobile GPS-enabled devices adapted for ease of portability by an exercising user, who subscribes to the system, and with whom a particular device is associated, to be in communication over a global wireless communications network, such as the internet, with a base computer that receives location-related data from the devices, recognises each individual device and updates an account associated with the device or a nominated subscriber who is a user of the device, with the location-related data.

In one version, the system base computer receives the data in a raw form, identifies the user to whom it relates and uploads it to the user's account. Further, it does the communication and calculations to determine whether or not the user has qualified for a reward. If or when the user does qualify, it is programmed to issue a notification to the relevant user.

In an alternative version, the user device (such as in the case of a smartphone) has on board sufficient computational capacity to store data relating to the user's travel events and data relating to the reward criteria and to calculate the user's reward status. When it determines that the user has qualified for a reward, it will issue a notification to the user (and optionally to the reward managing agency) that the user has qualified. The notification will preferably include a value token in the form of a voucher, with a unique number or barcode or the like that the user can then present at a reward issuing agency and claim the reward that the agency will issue. The voucher is issued electronically on the user's smartphone by means known in the art, such as are found in airlines and event management.

In another embodiment, the computer functions are shared between the base computer and the user device. In this example, the electromagnetic signal emitted by the signal-emitting device contains means for identifying the device, its associated user, presumed to be the individual commuter, or both and, in addition, the location of the device. The identifying means is a code or an electronic file of computer-readable identification data, mapping to the subscriber associated with such code or data. The signal is emitted to be transmitted over a global communications network such as the internet, and is received by a computer managed or operated by the administrator of the system, by downloading it over the internet.

The signal is emitted at regular intervals, enabling the receiving computer to detect and track changes in the location of the device, and hence in the location of the presumed user.

In a preferred embodiment, the computer is programmed with algorithms designed to recognise when changes in location of the user device that it has tracked over time constitute displacement representative of a commute, and to categorise it as a particular kind of commute, in particular a commute undertaken on a bicycle. Recognition of type is based on calculating rate of displacement and directional consistency, as well as apparent beginning and end locations. Recognition is preferably also assisted by reference to historical data of prior trips of different types undertaken by the subscriber, or by other subscribers.

When, as a result of its programming, the computer recognises a series of displacements as a commute, the computer adds data concerning the commute to an account established for the user, flagging or otherwise labelling the commute as a bicycle (or other) commute. When the user has accumulated a predetermined number of credits for qualifying commutes, or a predetermined qualifying distance covered by travel events recognised as a commutes, the commuter is notified that he (or she) qualifies for a reward.

Figure 2:
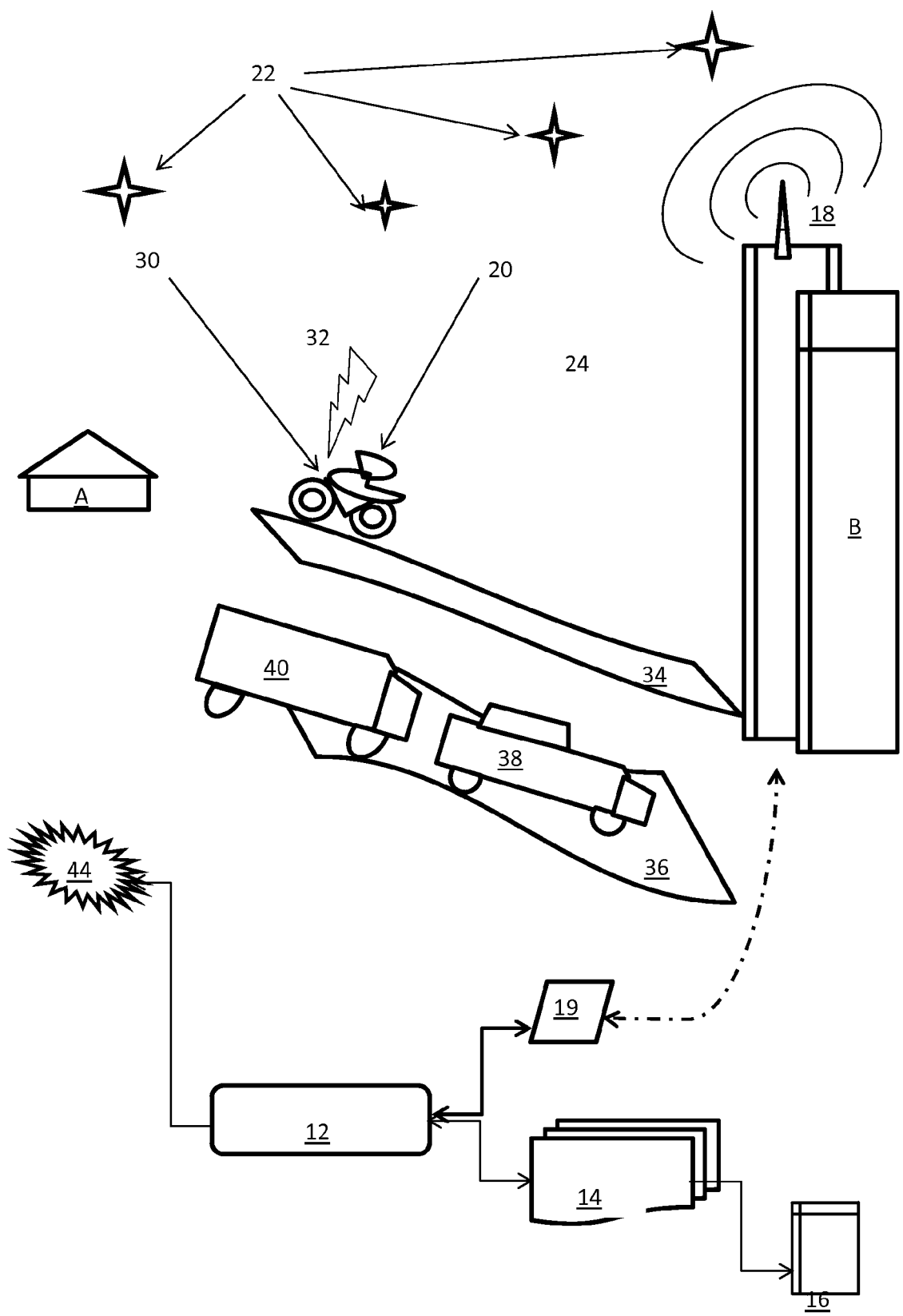
FIG. 2 presents a schematic diagram of the system of the invention according to a second embodiment.

Referring to FIG. 2, another example of the invention is described. The system, denoted generally by the numeral 10, comprises a base computer 12 which accesses a database 14, containing records of each subscriber to the system. Subscribers are commuters who travel between their place of residence A and place of work B by bicycle, and who elect to subscribe either in their personal capacity or through an organisation such as their employer. A subscription fee may be charged by the administrator of the system.

The subscriber data includes information fields, in particular concerning the identity of each subscriber and his or her residential address and electronic contact details, such as network IP address and email. Optionally, it may also contain data relating to the subscriber's work address, other contact details and banking account details, the latter for purposes of automatically deducting subscriptions such as by way of debit order, or for issuing rewards when a reward sounding in money or credit is issued to the subscriber, at the instance of the subscriber.

Allocated to each subscriber record in the database is an account 16.

When a subscriber 20 subscribes to the system, he also receives a software download to his portable internet-enabled and GPS-capable device 30, which is set up to communicate with a plurality of global positioning satellites 22 and emit a radio frequency signal 32, containing an identification code mapped to that subscriber. The signal is emitted in response to a stimulus broadcast from base computer 12 periodically over a mobile telephone network, to which the device 30 is connected.

The signal 32 is received via an antenna 18 of a mobile telephone network transmitting and receiving tower, and the code is communicated via the internet from the receiving station, to modem 19, which is in communication with base computer 12. Such further transmission could alternatively be transmitted wirelessly using a mobile telephone network.

Notably, the code need not be communicated over the internet or wirelessly at all, but between receiving station 22 and computer 12 by using alternative means, such as a telephone landline comprising data-transmitting cable, for example fibre optic cable.

Encryption of the data sent to the base computer is desirable, but not essential. However, encrypting it is considered preferable because of the danger of unscrupulous subscribers finding ways of generating bogus data. In addition, such encrypting of data is desirable for privacy considerations.

In the example of a subscriber who has signed up to receive rewards for cycling to work, the computer is programmed to take into account for reward purposes only the first commute tracked during a designated time period and posted to the credit of the particular subscriber's account. In this example, the period is a weekday from 12:00 midnight to midnight. Although the times of additional signals bearing the subscriber's unique identifying code may be recorded, signifying further displacement of the GPS device 30, only one commute will be recognised, on the assumption that a commuter cycling in to work will also cycle home within 24 hours. By programming the computer in this way, it is believed that the risk of reading errors and even of fraudulent repeated logging or moving of device 30 will be eliminated.

Alternatively, as mentioned in relation to the first embodiment described above, the computer is programmable to disregard signals that are repeatedly received within a stipulated time period. This time period can be programmed to be varied from day to day as an anti-fraud device, to avoid commuters getting wise to the way the system is programmed to operate.

The accuracy of the GPS system employed will enable the system base computer to determine whether a subscriber, determined by the system computer to be cycling, has followed a designated bike path, shown as 34 in FIG. 2. Therefore, if a subscriber chooses to travel by way of a vehicle roadway 36, or transports his bicycle on or in a vehicle 38, or worse still, carries his mobile phone on his person while driving in a car or travelling on a bus 40, the software programmed to the computer will detect the travel event and determine which category it should fall into. Based on the duration of the travel event and the distance covered, and the history of similar genuine cycling commutes taken previously by the subscriber or other subscribers at the same time of day, it will conclude that the travel event was not accomplished by bicycle, resulting in the subscriber's vehicle trip not being recognised for reward purposes.

The computer 12 regularly interrogates database 14 and accounts 16, testing the account status against a predetermined reward criterion or criteria for those accounts that meet the applicable criterion or criteria for a reward. When a subscriber's account 16 is found to qualify, a notification 44 is issued to advertise this fact. It is issued to the administrator of the system, and optionally also directly to the subscriber concerned, or following approval by the administrator.

The invention extends to providing means for travel events other than cycled commutes to be recognised. Thus, subject to privacy constraints being observed, or such constraints being waived by the subscriber, a data-bank can be built up to record and categorise all travel events, or selected kinds of travel events identified with and represented by the changing locations of the subscriber device reported over time, enabling the building of a profile of the subscriber.

The system provides an interface inviting the subscriber to state, when initiating inputs for a commute event, the purpose of the commute in addition to the destination address. For example, the subscriber enters their destination as "Coles," referring to a grocery store in the suburb "Mosman Park" with the type/purpose as "grocery shopping". The app then generates the appropriate address which the subscriber then approves or corrects. When the subscriber arrives at said Coles and the app compares its device location, it recognises the location as the intended destination and, if other pertinent criteria are satisfied, logs the travel event as a commute that qualifies for credits.

The invention provides in a further embodiment for means for the subscriber to disable transmissions of his location at any desired time. In addition, such means includes programmed prompts which can be selected by the subscriber to be issued at chosen times or intervals, or be issued after the device has not significantly changed location for a pre-set default or user-preselectable period.

Further, in a preferred embodiment, the device is programmed to reactivate location recording at a pre-set time of the day or on certain days of the week, according to a calendar. For, example, it could be programmed to wake up each weekday (excluding public holidays) at 17:15 each evening, this being the time when the subscriber expects to leave his place of work for the commute home.

The device can be programmed to monitor continuously the subscriber's location during particular hours, such as from dawn to dusk, and then, when the subscriber's location is found to conform to a recognized pattern based on his earlier records, identify this as the beginning of a commute. In another example, the location of the subscriber's home and workplace are stored in the computer, and movements of the device between these locations are tracked, to determine whether these movements are consistent with a bicycle ride, or a walk, or a jog, a run or other kind of physical exercise constituting a beneficial form of travel as envisaged and defined according to the system criteria.

From time to time, data stored on the device is uploaded to cloud storage or to storage associated with the base computer. This facility assists in protecting against loss of data should the device be lost, damaged or destroyed.

In the case of the subscriber being a cycling commuter, the system includes programming for the computer to allocate reward credits to the commuter based on units of distance travelled, or number of commutes completed, or both. Other criteria may be taken into account in the awarding of credits and the number thereof, such as the time of day of the commute, the weather conditions, the date or season, or the route followed. Bonus credits may be awarded for following particular routes, or travelling during particular hours of the day. Reward credits may also be earned for travelling in rainy weather, or when temperatures are forecast to exceed a given temperature, or not rise to a pre-ordained threshold temperature, or when pollution levels are elevated, or when international oil prices are elevated, or relatively low. Commuter psychology input may be incorporated into the reward-issuing model.

The signal containing the data of the commuter's location is received in and stored either in the on-board computer memory of the device for later upload to the system management computer such as via its website, or is immediately so uploaded, using a wireless internet link (or suitable alternatives available in the art) for data transfer.

The identity of the subscriber, whose device emitted or is emitting the received signal, is determined by matching the identifying means in the signal with the name of the subscribing commuter associated with this identifier in a computer-managed database. The computer then causes an account associated with the commuter subscriber to be updated to record the fact of his signal-emitting device having been at its particular location. In this way, a record of the changes in location of the device and, by extension, commutes undertaken by a subscriber, is created. When the record or the account meets certain pre-established criteria, a determination is made as to whether or not the subscriber qualifies for a reward, or even a range of rewards. If he does, the computer is programmed to allocate a reward to the subscriber associated with the record or account and issues notification accordingly, or notifies the subscriber that he qualifies for one or more from a set of rewards, at his election. The notification is preferably sent over the internet to an email address of the subscriber, a social media page, or via a text message or buzzing alert on his mobile communications device.

The signal-emitting device may be a dedicated signal-emitting device such as a GPS which is attached to the bicycle of the commuting subscriber, for example to the frame or beneath the seat or saddle, or which is carried on the person of the subscriber. Alternatively, it may be a mobile communications device such as a mobile telephone, in particular a smart phone that is GPS-enabled.

In a non-limiting example, the system makes use of a real time location system (RTLS) for logging the location of the subscriber's signal-emitting device. The RTLS includes a receiver for receiving a signal emitted by a transmitter device associated with a subscriber.

By way of example, the RTLS uses standard 3G or 4G mobile telephone data communication between phone and mobile phone communications tower for transmitting a data file identifying the subscriber associated with the signal-emitting device, to the tower, for onward transmission to a server computer for processing and updating of the subscriber account concerned. The result is the compilation of a record of commutes undertaken by or associated with the transmitting device of each subscriber to the system.

The reward provided to subscribers, meeting the qualifying criterion or set of criteria, is in a form that will be perceived as being of value to the commuter. For example, it may be financial, or may award the qualifying commuter the right to use a dedicated fast commuter lane reserved for only the most frequent bicycle commuters. It may also be in the form of the right to use particular bicycle commuter-related facilities in a city. Clearly the range of potential rewards is without limitation.

The reward system will be based on each subscriber receiving a basic award credit for each day a commute made for his account is detected. This basic credit may be tailored to different licensee requirements. Additional rewards will be allocated according to distance cycled.

In a preferred embodiment of this invention, the reward is based on the distance a subscribing commuter cycles to work. This distance is calculated from real time locations means such as the GPS associated with the subscriber's mobile device, typically his GPS-enabled smartphone.

Optionally, the system includes programming means for detecting the presence of the subscriber in areas lying beyond an available designated cycle path when determined to be commuting by bicycle, and then penalising the relevant subscriber's account by deducting credit. This is intended to increase the incentive for not seeking to defraud the system and for the subscriber to stick to designated commuter or bicycle or runner pathways. Alternatively, the system may be programmed to zero-rate travel on a roadway when a dedicated bikeway or other track is available and not used and award bonus value for electing to use the bikeway.

The computer is optionally but desirably linked to a website, such as the website of the system administrator, a city public transport authority, or a transport operator. The website desirably has pages dedicated to allowing subscribers online access in order to enable them to:
  register with or subscribe to the system,
  order a transmitting device, for example a mobile telephone or a GPS device adapted for use in the system,
  download application software for interfacing with the system base computer,
  monitor their account and related credits, and
  claim rewards electronically,
  download or print a voucher recording their credit amount, which, when presented by the subscriber or his delegate at a participating reward-issuing organisation, is convertible to a financial or other reward, or
  place an online order with a participating reward-supplying entity, such as a retailer, or fitness service provider, or bicycle servicing workshop.

It is within the scope of the invention for the system to interface with the websites of sponsors, enabling the display of audio and/or visual information emanating from the sponsor to be outputted to the subscriber. Such outputs could be programmed to appear on the happening of specific events, for example when the program application starts up, or shuts down, or at the end of a travel event, or the end of a particularly high reward-earning commute, such as one carried out in adverse conditions, such as low or high air temperatures, or at a high rate, or over a significant change in altitude.

Alternatively, such outputs may be caused to appear during a travel event, at regular intervals, or specific time slots during the day, for example at 07:15, this being during peak commuter time.

In addition, or alternatively, the system is programmed for the app to access public transport databases and interface with ticketing/event databases for allowing targeted rewards for specific occasions and hence encourage desired public commuting. For example, subscribers receiving bonus credits or free public transport to football games.

The device associated with the subscriber, in particular a mobile smartphone or other worn computation device such as worn around a wrist, arm or the waist, or incorporated in eyeglasses or headgear, may also be programmed according to the system of the invention to receive real time data from monitoring instruments other than a locating device. Examples of such inputs include heart rate, body temperature, blood pressure and the like. External data such as pertain to environmental conditions may also usefully be received and inputted. These may include air temperature, altitude, air pollution levels, noise levels, relative humidity, barometric pressure and wind speed.

In cases where the monitoring instrument is carried on the person of the subscriber, such as in the case of a heart monitor, real time data may be communicated to the subscriber device (e.g. smartphone) by a wireless communication protocol such as is known under the Bluetooth® trademark. Preferably, the smartphone either has built-in or add-on sensor attachments dedicated to detect relevant desired variables, or is programmed to receive real time environmental data from broadcasting agencies, such as over the internet.

The invention extends to the system having a plurality of designated cycling routes being established, each when used by a subscriber, earning bonus credits or benefits by way of reward for keeping away from roads intended for motor vehicle traffic only.

Thus the system is configured for development in modules for expansion into a network of bike-ways. In this way, rewards may be given to subscribers electing to travel by beneficial modes, whether following their daily routine (shopping, visiting doctors, post offices etc.) or travelling to special events, rather than only to work during the working week. Such events may be trade shows, rallies, major sporting events, concerts and the like where traffic congestion and parking issues are expected to arise.

The setting of specific time periods over which travel event data is collected and counted is adaptable to take into account public holidays, or special event periods and off-peak periods. By setting the period and reward criteria applicable to a particular period, inducements can be offered for people to cycle during promotional periods, such as out of peak hours.

An advantage of this invention is that its adoption by commuters is likely to reduce weekday pressure on alternative transport such as buses and trains, as well as on the road system. This is expected to result in reduced traffic congestion in the CBD, as well as reduction of pressure on CBD parking resources. However, the system can be applied in the cases of other urban areas or venues that attract concentrated vehicular traffic, for example universities, colleges, stadiums and industrial or business areas other than the CBD. It can also be extended to less populated areas for the other health and environmental benefits already noted.

Another advantage is that the health of subscribers is likely to improve and be maintained while they participate as active subscribers. This will lead to a reduction in the cost of state or government healthcare requirements, allowing re-allocation of resources.

An environmental advantage is that there is expected to be an improvement in CBD ambience due to the increase in bicycle riding, running and walking and a related reduction in the use of motor vehicles. Broader environmental advantages are expected to flow, including lowering of pollution levels from fossil fuel consumption being avoided.

Road safety will benefit through the incentive given to cyclists and runners to use designated bike paths, bike-ways and shared pathways instead of normal roads. Swimmers can be encouraged to cross rivers or other waterways at patrolled crossing zones.

A key advantage of the system set out in this invention is that the more an individual subscriber exercises, the more they are personally rewarded, whether through a better level of health or pecuniary or material benefits. At the same time the community benefits through lower population health expenses.

These embodiments merely illustrate particular examples of the method, and system of reward of the invention. With the insight gained from this disclosure, the person skilled in the art is well placed to discern further embodiments by means of which to put the claimed invention into practice.

The invention claimed is:

1. A system for recognizing and rewarding desirable commuting behavior by subscribers to the system, said system comprising:
    data storage means comprising an electronic register of subscribers to the system and an account for each;
    tracking means for tracking a subscriber travel event; and
    computer means programmed to:
        determine whether the travel event meets predefined commute-qualifying criteria for categorizing said travel event as a commute;
        determine a credit value for each commute according to predetermined value criteria and update the account of the associated subscriber with the value determined;
        compare an accumulation of value in a subscriber's account with a reward-issuing threshold; and
        cause the subscriber to be notified of having qualified for a reward when the reward-issuing threshold is exceeded;
    wherein the tracking means comprises locating means for locating in real time the subscriber or individual members of a group of persons associated with the subscriber, the tracking means further comprises a global positioning system (GPS) enabled device uniquely associated with the subscriber and having means for communicating time- and location-related data to said computer means; and
    wherein the computer means is programmed to process said data to detect changes in subscriber location over time and, on the basis of said changes, determine a means most likely used by the subscriber in changing location.

2. The system of claim 1, wherein the data storage means contains individual subscriber data and wherein a travel event is determined to qualify as a commute on the basis of comparing data of the tracked travel event with said individual subscriber data.

3. The system of claim 2, wherein the subscriber data comprises the subscriber's address and working hours and data relating to the subscriber's previously tracked travel events.

4. The system of claim 2, wherein the credit value is a function of a beneficial effect of a commute, computed according to pre-defined benefit criteria, taking into account any of: the time when the or each commute segment took place; the subscriber's degree of avoidance of public roads used by licensed motor vehicles; and a threshold level of human effort deemed to be required in the commute.

5. The system of claim 4, wherein the commute comprises segments and the credit value is determined taking into account a value for each segment.

6. The system of claim 1, comprising programming instructions rendering the computer means capable of generating a profile of the subscriber from its historical commute data.

7. The system of claim 6, wherein the tracking means comprises transponder means uniquely associated with the subscriber and receiver means configured to detect the signal, the receiver means being located proximate to a commuter route.

8. The system of claim 6, wherein the commuter route is a dedicated route reserved for commuters from the group consisting of one or more of runners, pedestrians and riders of conveyances that are not combustion-engine driven and have no more than three wheels.

* * * * *